(12) United States Patent
Lenard et al.

(10) Patent No.: US 7,885,896 B2
(45) Date of Patent: Feb. 8, 2011

(54) METHOD FOR AUTHORIZING A SUBSTITUTE SOFTWARE LICENSE SERVER

(75) Inventors: Rohan Lenard, Crows Nest (AU); Julian J. Orbach, Ryde (AU); Martin Smyrk, Collaroy Plateau (AU)

(73) Assignee: Avaya Inc., Basking Ridge, NJ (US)

( * ) Notice: Subject to any disclaimer, the term of this patent is extended or adjusted under 35 U.S.C. 154(b) by 1051 days.

(21) Appl. No.: 10/191,716

(22) Filed: Jul. 9, 2002

(65) Prior Publication Data

US 2004/0010469 A1   Jan. 15, 2004

(51) Int. Cl.
G06F 21/00   (2006.01)

(52) U.S. Cl. .................................. 705/59; 714/4; 726/4

(58) Field of Classification Search .................. 705/58, 705/59; 713/100, 182; 709/201–3, 225; 726/1–36
See application file for complete search history.

(56) References Cited

U.S. PATENT DOCUMENTS

| | | | |
|---|---|---|---|
| 4,288,659 A | 9/1981 | Atalla | |
| 4,405,829 A | 9/1983 | Rivest et al. | |
| 4,780,821 A | 10/1988 | Crossley | |
| 4,811,393 A | 3/1989 | Hazard | |
| 4,888,800 A | 12/1989 | Marshall et al. | |
| 4,937,863 A | 6/1990 | Robert et al. | |
| 5,005,122 A * | 4/1991 | Griffin et al. ................. | 709/203 |
| 5,023,907 A | 6/1991 | Johnson et al. | |
| 5,157,663 A | 10/1992 | Major et al. | |
| 5,179,591 A | 1/1993 | Hardy et al. | |
| 5,204,897 A | 4/1993 | Wyman | |
| 5,206,903 A | 4/1993 | Kohler et al. | |
| 5,230,020 A | 6/1993 | Hardy et al. | |
| 5,260,999 A | 11/1993 | Wyman | |
| 5,307,481 A | 4/1994 | Shimazaki et al. | |
| 5,329,570 A | 7/1994 | Glassmacher et al. | |
| 5,341,427 A | 8/1994 | Hardy et al. | |

(Continued)

FOREIGN PATENT DOCUMENTS

EP   1071253   1/2001

(Continued)

OTHER PUBLICATIONS

U.S. Appl. No. 10/947,418, filed Sep. 21, 2004, Gilman.

(Continued)

*Primary Examiner*—Evens J Augustin
*Assistant Examiner*—Jamie Kucab
(74) *Attorney, Agent, or Firm*—Sheridan Ross P.C.

(57) ABSTRACT

The present method for authorizing a substitute software license server allows the software provider to approve the temporarily usage of the customer's substitute license server to process application file usage requests when the host license server fails. The host license server is assigned a unique host identification for authorizing simultaneous usage of a plurality of application files having the same host identification, thus preventing a substitute license server from authorizing usage of the plurality of application files without obtaining host identification. A software provider server connected to the substitute license server via a network connection downloads a temporary identification and application files having the temporary identification to the substitute license server to allow the substitute license server to process the application file usage requests that are received by the substitute license controller.

14 Claims, 4 Drawing Sheets

U.S. PATENT DOCUMENTS

| | | | |
|---|---|---|---|
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,579,222 A | 11/1996 | Bains et al. | |
| 5,646,992 A | 7/1997 | Subler et al. | |
| 5,671,412 A | 9/1997 | Christiano | |
| 5,673,315 A | 9/1997 | Wolf | |
| 5,699,431 A | 12/1997 | Van Oorschot et al. | |
| 5,708,709 A | 1/1998 | Rose | |
| 5,717,604 A | 2/1998 | Wiggins | |
| 5,724,428 A | 3/1998 | Rivest | |
| 5,742,757 A * | 4/1998 | Hamadani et al. | 726/32 |
| 5,745,569 A | 4/1998 | Moskowitz et al. | |
| 5,745,576 A | 4/1998 | Abraham et al. | |
| 5,745,879 A | 4/1998 | Wyman | |
| 5,754,761 A | 5/1998 | Willsey | |
| 5,758,068 A | 5/1998 | Brandt et al. | |
| 5,758,069 A | 5/1998 | Olsen | |
| 5,790,074 A | 8/1998 | Rangedahl et al. | |
| 5,790,664 A * | 8/1998 | Coley et al. | 709/203 |
| 5,796,941 A | 8/1998 | Lita | |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | |
| 5,935,243 A | 8/1999 | Hasebe et al. | |
| 5,940,504 A | 8/1999 | Griswold | |
| 5,956,505 A | 9/1999 | Manduley | |
| 5,956,716 A | 9/1999 | Kenner et al. | |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,006,016 A * | 12/1999 | Faigon et al. | 714/48 |
| 6,009,401 A | 12/1999 | Horstmann | |
| 6,011,973 A | 1/2000 | Valentine et al. | |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | |
| 6,128,389 A | 10/2000 | Chan et al. | |
| 6,134,660 A | 10/2000 | Boneh et al. | |
| 6,148,415 A * | 11/2000 | Kobayashi et al. | 714/15 |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,343,280 B2 | 1/2002 | Clark | |
| 6,360,320 B1 | 3/2002 | Ishiguro et al. | |
| 6,381,747 B1 | 4/2002 | Wonfor et al. | |
| 6,414,595 B1 * | 7/2002 | Scrandis et al. | 340/506 |
| 6,421,726 B1 * | 7/2002 | Kenner et al. | 709/225 |
| 6,442,708 B1 * | 8/2002 | Dierauer et al. | 714/25 |
| 6,463,534 B1 | 10/2002 | Geiger et al. | |
| 6,498,791 B2 | 12/2002 | Pickett et al. | |
| 6,502,079 B1 | 12/2002 | Ball et al. | |
| 6,513,117 B2 | 1/2003 | Tarpenning et al. | |
| 6,513,121 B1 | 1/2003 | Serkowski | |
| 6,539,481 B1 * | 3/2003 | Takahashi et al. | 726/5 |
| 6,557,105 B1 | 4/2003 | Tardo et al. | |
| 6,574,612 B1 * | 6/2003 | Baratti et al. | 705/59 |
| 6,584,454 B1 | 6/2003 | Hummel, Jr. et al. | |
| 6,615,347 B1 | 9/2003 | de Silva et al. | |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 | 2/2004 | Ishiguro et al. | |
| 6,760,324 B1 | 7/2004 | Scott et al. | |
| 6,765,492 B2 | 7/2004 | Harris | |
| 6,769,063 B1 | 7/2004 | Kanda et al. | |
| 6,772,133 B1 | 8/2004 | Kambayashi et al. | |
| 6,775,782 B1 | 8/2004 | Buros et al. | |
| 6,778,820 B2 | 8/2004 | Tendler | |
| 6,785,726 B1 | 8/2004 | Freeman et al. | |
| 6,795,941 B2 * | 9/2004 | Nickels | 714/706 |
| 6,816,842 B1 | 11/2004 | Singh et al. | |
| 6,826,606 B2 | 11/2004 | Freeman et al. | |
| 6,842,896 B1 * | 1/2005 | Redding et al. | 717/172 |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1 | 7/2005 | Doherty et al. | |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,941,283 B2 | 9/2005 | Kambayashi et al. | |
| 6,957,344 B1 | 10/2005 | Goldshlag et al. | |
| 6,959,291 B1 | 10/2005 | Armstrong et al. | |
| 6,961,858 B2 | 11/2005 | Fransdonk | |
| 6,968,384 B1 * | 11/2005 | Redding et al. | 709/229 |
| 6,973,444 B1 | 12/2005 | Blinn et al. | |
| 6,976,164 B1 | 12/2005 | King et al. | |
| 6,981,222 B2 | 12/2005 | Rush et al. | |
| 6,993,664 B2 | 1/2006 | Padole et al. | |
| 7,032,113 B2 | 4/2006 | Pendlebury | |
| 7,035,918 B1 * | 4/2006 | Redding et al. | 709/223 |
| 7,065,214 B2 | 6/2006 | Ishiguro et al. | |
| 7,073,063 B2 | 7/2006 | Peinado | |
| 7,080,402 B2 | 7/2006 | Bates et al. | |
| 7,085,382 B2 | 8/2006 | Terao et al. | |
| 7,096,469 B1 | 8/2006 | Kubala et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,127,442 B2 | 10/2006 | Mazza et al. | |
| 7,139,737 B2 | 11/2006 | Takahashi et al. | |
| 7,143,409 B2 | 11/2006 | Herrero | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,197,321 B2 | 3/2007 | Erskine et al. | |
| 7,206,936 B2 | 4/2007 | Aull et al. | |
| 7,216,363 B2 | 5/2007 | Serkowski et al. | |
| 7,225,333 B2 | 5/2007 | Peinado et al. | |
| 7,228,426 B2 | 6/2007 | Sinha et al. | |
| 7,228,567 B2 | 6/2007 | Serkowski et al. | |
| 7,272,500 B1 | 9/2007 | Walker | |
| 7,278,164 B2 | 10/2007 | Raiz et al. | |
| 7,283,519 B2 | 10/2007 | Girard | |
| 7,302,703 B2 | 11/2007 | Burns | |
| 7,308,717 B2 | 12/2007 | Koved et al. | |
| 7,310,734 B2 | 12/2007 | Boate et al. | |
| 7,313,828 B2 | 12/2007 | Holopainen | |
| 7,318,236 B2 | 1/2008 | DeMello et al. | |

| Patent/Pub No. | Date | Name |
|---|---|---|
| 7,336,791 B2 | 2/2008 | Ishiguro |
| 7,353,388 B1 | 4/2008 | Gilman |
| 7,356,692 B2 | 4/2008 | Bialick et al. |
| 7,373,657 B2 | 5/2008 | Walker |
| 7,382,881 B2 | 6/2008 | Uusitalo et al. |
| 7,383,205 B1 | 6/2008 | Peinado et al. |
| 7,415,729 B2 | 8/2008 | Ukeda et al. |
| 7,545,931 B2 | 6/2009 | Dillaway |
| 7,552,166 B2 | 6/2009 | Chack |
| 7,565,325 B2 | 7/2009 | Lenard et al. |
| 2001/0001268 A1 | 5/2001 | Menon et al. |
| 2001/0034846 A1 | 10/2001 | Beery |
| 2002/0013722 A1 | 1/2002 | Kanaga |
| 2002/0017977 A1 | 2/2002 | Wall |
| 2002/0038422 A1 | 3/2002 | Suwamoto et al. |
| 2002/0052939 A1 | 5/2002 | Lee |
| 2002/0083003 A1 | 6/2002 | Halliday et al. |
| 2002/0087892 A1 | 7/2002 | Imazu |
| 2002/0107809 A1 | 8/2002 | Biddle et al. |
| 2002/0112186 A1 | 8/2002 | Ford et al. |
| 2002/0116340 A1 | 8/2002 | Hellberg et al. |
| 2002/0138441 A1 | 9/2002 | Lopatic |
| 2002/0154777 A1 | 10/2002 | Candelore |
| 2002/0169625 A1 | 11/2002 | Yang et al. |
| 2002/0169725 A1 | 11/2002 | Eng |
| 2002/0188656 A1 | 12/2002 | Patton et al. |
| 2002/0188704 A1 | 12/2002 | Gold |
| 2003/0013411 A1 | 1/2003 | Uchiyama |
| 2003/0018491 A1 | 1/2003 | Nakahara et al. |
| 2003/0018582 A1 | 1/2003 | Yaacovi |
| 2003/0023564 A1 | 1/2003 | Padhye et al. |
| 2003/0055749 A1 | 3/2003 | Carmody et al. |
| 2003/0084306 A1* | 5/2003 | Abburi et al. ............... 713/188 |
| 2003/0095542 A1 | 5/2003 | Chang et al. |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0159033 A1 | 8/2003 | Ishiguro |
| 2003/0159070 A1* | 8/2003 | Mayer et al. ............... 713/201 |
| 2003/0163428 A1 | 8/2003 | Schneck et al. |
| 2003/0172035 A1 | 9/2003 | Cronce et al. |
| 2003/0177393 A1 | 9/2003 | Ishiguro |
| 2003/0191936 A1 | 10/2003 | Kawatsura et al. |
| 2003/0208449 A1 | 11/2003 | Diao |
| 2003/0233547 A1 | 12/2003 | Gaston et al. |
| 2004/0010440 A1 | 1/2004 | Lenard et al. |
| 2004/0044629 A1 | 3/2004 | Walker et al. |
| 2004/0044630 A1 | 3/2004 | Walker et al. |
| 2004/0044631 A1 | 3/2004 | Walker et al. |
| 2004/0047354 A1* | 3/2004 | Slater et al. ............... 370/400 |
| 2004/0054930 A1 | 3/2004 | Walker et al. |
| 2004/0073517 A1 | 4/2004 | Zunke et al. |
| 2004/0078339 A1 | 4/2004 | Goringe et al. |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. |
| 2004/0133794 A1 | 7/2004 | Kocher et al. |
| 2004/0162998 A1 | 8/2004 | Tuomi et al. |
| 2004/0172367 A1 | 9/2004 | Chavez |
| 2004/0181696 A1 | 9/2004 | Walker |
| 2004/0249763 A1 | 12/2004 | Vardi |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1 | 4/2005 | Eng |
| 2005/0091507 A1 | 4/2005 | Lee et al. |
| 2005/0144437 A1 | 6/2005 | Ransom et al. |
| 2005/0154877 A1 | 7/2005 | Trench |
| 2005/0185792 A1 | 8/2005 | Tokutani et al. |
| 2005/0198510 A1 | 9/2005 | Robert et al. |
| 2005/0202830 A1 | 9/2005 | Sudit |
| 2005/0229004 A1 | 10/2005 | Callaghan |
| 2005/0246098 A1 | 11/2005 | Bergstrom et al. |
| 2005/0289072 A1 | 12/2005 | Sabharwal |
| 2006/0021068 A1 | 1/2006 | Xu et al. |
| 2006/0026105 A1 | 2/2006 | Endoh |
| 2006/0036554 A1 | 2/2006 | Schrock et al. |
| 2006/0036894 A1 | 2/2006 | Bauer et al. |
| 2006/0064582 A1 | 3/2006 | Teal et al. |
| 2006/0089912 A1 | 4/2006 | Spagna et al. |
| 2006/0178953 A1 | 10/2006 | Aggarwal et al. |
| 2006/0242083 A1 | 10/2006 | Chavez |
| 2006/0294010 A1 | 12/2006 | Kim et al. |
| 2007/0033419 A1 | 2/2007 | Kocher et al. |
| 2007/0094710 A1 | 4/2007 | Walker et al. |
| 2007/0107067 A1 | 5/2007 | Fountian |
| 2007/0219917 A1 | 9/2007 | Liu et al. |
| 2008/0052295 A1 | 2/2008 | Walker et al. |
| 2008/0082449 A1 | 4/2008 | Wilkinson et al. |
| 2008/0141242 A1 | 6/2008 | Shapiro |
| 2008/0189131 A1 | 8/2008 | Chavez |

FOREIGN PATENT DOCUMENTS

| | | |
|---|---|---|
| EP | 1562378 | 8/2005 |
| JP | 2006/085481 | 3/2006 |

OTHER PUBLICATIONS

U.S. Appl. No. 10/956,861, filed Sep. 30, 2004, Robinson.
U.S. Appl. No. 11/051,316, filed Feb. 4, 2005, Mazza.
U.S. Appl. No. 11/222,997, filed Sep. 8, 2005, Rao.
U.S. Appl. No. 12/609,846, filed Oct. 30, 2009, Walker et al.
ADTech Engineering, "IP Phone SI-160 User Manual (SCCP releases)," Version 1.2 (2002), pp. 1-20.
ARSYS, "Public Key Infrastructure," (Feb. 4, 2001), available at http://www.transactiontrust.com/technicaindex.html, 4 pages.
Articsoft Limited, "Public Key Infrastructure (PKI) FAQs" (Feb. 2, 2003), available at http://www.articsoft.com/wp_pki_faq.htm, 5 pages.
Clarke, Roger, "Centrelink Smart Card Technical Issues Starter Kit Chapter 7" (Apr. 8, 1998) at http://wwvv.anu.edu.au/people/Roger.Clarke/DV/SCTISK.html, pp. 1-3.
Datakey, "Securing a Virtual Private Network withSmart Card Technology", Aug. 1, 2002; available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1 Iss. 1 (Jan. 2000), available at http://wvvw.discerningtoday.org/members/Digest/2000Digest/January/Global%20Control.htm, 2 pages.
Entrust Inc., "Entrust Authority Security Manager," (printed Aug. 13, 2004), avaiable at http://www.entrust.com/authority/manager/index.htm, 23 pages.
Giswold, Robert S., "Get Smart: The Coming Revolution of Smart Cards," Journal of Property Management (May/Jun. 1997), 5 pages.
Info Merchant Store, "VeriFone 2000, MS/DUKPT/STD Pin Pad, New" (printed Feb. 17, 2004), avaiable at http://www.merchantamerica.com/creditcardterminals/index.php?ba=product_enlarge&product=9632, 1 page.
Infosec Engineering, "Building a Corporate Public Key Infrastructure" (1999), available at http://www.infoseceng.com/corppki.htm, 20 pages.
LockStream Corporation, "Catalyst DRM Service Platform"; available at http://www.lockstream.com/products_spcm.php, 1 page; 2003.
LockStream Corporation, "Lockstream KeyDRM"; available at http://www.lockstream.com/products_1gm.php, 2 pages; 2003.
LockStream Corporation, "Lockstream OMA 1.0 DRM Client", available at http://www.lockstream.com/products_sprm.php, 2 pages; 2003.

LockStream Corporation, Catalyst DRM Service Platform Architecture, Vers. 1.0 (Nov. 2003), pp. 1-28.
Microsoft Corporation, "Accessing a Smart Card" (Aug. 2002), avaiable at http://msdn.microsoft.com/library/en-us/security/security/accessing_a_smart_card.asp, p. 1.
Microsoft Corporation, "Base Service Providers" (Aug. 2002), avaiable at http://msdn.microsoft.com/library/en-us/security/security/base_service_providers.asp, p. 1.
Microsoft Corporation, "Building an ISO7816-4 APDU Command" (Aug. 2002), avaiable at http://msdn.microsoft.com/library/en-us/security/security/building_an_iso7816_4_apdu_command.asp, pp. 1-2.
Microsoft Corporation, "Introducing Smart Cards to theSystem" (Aug. 2002), avaiable at http://msdn.microsoft.com/library/en-us/security/security/introducing_smart_cards_to_the_system.asp, p. 1.
Microsoft Corporation, "Primary Service Provider" (Aug. 2002), avaiable at http://msdn.microsoft.com/library/en-us/security/security/primary_service_provider.asp, p. 1.
Microsoft Corporation, "Smart Card Authentication" (Aug. 2002), avaiable at http://msdn.microsoft.com/library/en-us/security/security/smart_card_authentication.asp, pp. 1-2.
Microsoft Corporation, "Smart Card Interfaces" (Aug. 2002), avaiable at http://msdn.microsoft.com/library/en-us/security/security/smart_card_interfaces.asp, pp. 1-2.
Microsoft Corporation, "Smart Card Resource Manager" (Aug. 2002), avaiable at http://msdn.microsoft.com/library/en-us/security/security/smart_card_resource_manager.asp, pp. 1.
Microsoft Corporation, "Smart Card Service Providers" (Aug. 2002), avaiable at http://msdn.microsoft.com/library/en-us/security/security/smart_card_service_providers.asp, pp. 1.
Microsoft Corporation, "Smart Card User Interface" (Aug. 2002), avaiable at http://msdn.microsoft.com/library/en-us/security/security/smart_card_user_interface.asp, pp. 1.
Microsoft Corporation, "Vendor Wrapper Service Providers" (Aug. 2002), avaiable at http://msdn.microsoft.com/library/en-us/security/security/vendor_wrapper_service_providers.asp, pp. 1.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://motorola.com/LMPS/pressreleases/page88.htm, 3 pages.
NEC Infrontia Corporation Press Release, "Establishment of "SmartCardInfrontia" solutions for 'IC card'," (Mar. 13, 2002), 4 pages.
NetLingo Dictionary of Internet Words, "Smart Card" (1995-2004), available at http://vvww.netlingo.com/lookup.cfm?term=smart+card, 2 pages.
Novell®, "Certificate Server: Public Key Infrastructure," White Paper (1999), pp. 1-10.
Rankl, Wolfgang, "Smart Card Handbook,", available at http://www.wrankl.de/SCH/SCH.html, 8 pages; 1998-2004.
Russinovich, Mark, "Inside Encrypting Fily System, Part 1," Windows & .NET Magazine (Jun. 1999), available at http://www.winntmag.com/Articles/Index.cfm?ArticleID=5387&Key=Internals, 4 pages.
Russinovich, Mark, "Inside Encrypting Fily System, Part 2," Windows & .NET Magazine (Jul. 1999), available at http://www.winntmag.com/Articles/Index.cfm?ArticleID=5592&Key=Internals, 5 pages.
Security Config, Back Up Your Encrypting File System Private Key in Windows 2000 Download; avaiable at http://www.securityconfig.com/software/alerts/back_up_your_encrypting_file_system_private_key_in_windows_2000.html, 2 pages; 2003.
Smart Card Alliance Industry News, "Cubic Corp. Intoduces New National Security and Homeland Defense" (Sep. 9, 2002), avaiable at http://wvvw.smartcardalliance.org/industry_news/industry_news_item.cfm?itemID=310, 2 pages.
Smart Card Alliance Industry News, "Cubic Introduces New Mobile Ticketing Machine" (Jul. 3, 2003), avaiable at http://www.smartcardalliance.org/industry_news/industry_news_item.cfm?itemID=852, 2 pages.
SSH Communications Security Corp., "Enabling Virtual Public Networks with Public Key Infrastructure," White Paper (Jan. 2004), pp. 1-9.
Streetman, Kibbee K. et al., "Public Key Infrastructure: Resources, Requirements and Recommendations," ATI IPT Special Report 00-06 (Apr. 20000), pp. 145.
Sun Developer Network, "Smart Card Overview," Sun Microsystems, Inc. (1994-2004), avaiable at http://java.sun.com/products/javacard/smartcards.html, 2 pages.
VeriFone Inc., "VeriFone Payment Solutions: Point-of-Sale PINpads" (1997-2004), available at http://www.verifone.com/products/printers_peripherals/html/pinpad_family.html, 1 page.
Whatis.com Target SearchTM, "PKI" (Jan. 13, 2004), available at http://whatis.techtarget.com/definition/0,2989893,sid9_gci214299,00.html, 4 pages.
Microsoft Software Piracy Protection "Product Activation Facts", at http://www.microsoft.com/piracy/activation_faq.mspx, Copyright 2005, 10 pages.
SIP.edu Cookbook, "SIP.edu and Avaya Converged Community Server", at http://mit.edu/sip/sip.edu/avaya.shtml, (Nov. 2004, Mar. 2005) 19 pages.
Avaya—"Product Support Notices (All Avaya Products): Product Support Notices", at http://support.avaya.com/japple/css/japple?temp.documentID=233413&temp.productID=1....undated, 2 pages; 2005.
Avaya—"Voice over IP Monitoring" at http://www.avaya.com/gcm/master-usa/en-us/products/offers/integrated_mgt_voip_monoto..... copyright 2005, 2 pages.
Sun Microsystems, Inc. Java Cryptography Architecture API Specification & Reference, Aug. 4, 2002, 56 pages.
MATLAB Installation Guide for PC, Release 11, The MathWorks Inc, 1999.
Microsoft Systems Management Server 2.0 Resource Guide, Microsoft Press, 1999. ISBN 0-7356-0583-1.
Windows NT Server 4. Garms, Jason. SAMS Publishing, 1998. ISBN 0-672-31249-2.
Java Skyline: Java Servlet/Server Headline News, Oct. through Dec. 1998, pp. 1-3.
FLEXlm End Users Guide, Version 9.2. Jul. 2003. Published by Macrovision. 166 pages.
A. Menezes, P. van Oorschot and S. Vanstone, Handbook of Applied Cryptography, cr8523_01[1].pdf, Chapter 1, 48 pages, 1997.
A. Menezes, P. van Oorschot and S. Vanstone, Handbook of Applied Cryptography, cr8523_1 0[1].pdf, Chapter 10, 40 pages, 1997.
A. Menezes, P. van Oorschot and S. Vanstone, Handbook of Applied Cryptography, cr8523_12[1].pdf, Chapter 12, 53 pages, 1997.
Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.
Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.
Multos Fights On, Jan. 2004, Thomson Media, Inc., Jan. 2004, pp. 1-7.
Background of the Invention for the above-captioned patent application (previously provided).
"RightNow Technologies and MarketFirst Partnership Delivers Complete E-Marketing Solution", PR Newsire, Aug. 14, 2001, p. 1.
US 5,742,747, 04/1998, Hamadani et al. (withdrawn)

* cited by examiner

METHOD FOR AUTHORIZING A SUBSTITUTE SOFTWARE LICENSE SERVER

FIELD OF THE INVENTION

The invention relates to software licensing, and in particular to a system for authorizing a redundant software license server to process software license requests in the event of primary software license server failure.

PROBLEM

It is a problem in the software field to prevent the unavailability of necessary application files from decreasing employee productivity while also allowing the business to purchase and concurrently use more than one copy of the application files. A number of software publishers license software files under a pricing model wherein a customer purchases the right to concurrently use a predetermined number of copies. Software files that are sold for concurrent use are often delivered with license management software installed on a license server, from which the customer requests software licenses. The licensing management software ensures that the customer does not use more software licenses than they have purchased and are entitled to use. A problem arises when the software license management system fails.

Effective management of multiple copies of application files presents a major dilemma for computer site administrators and software application publishers. The focus of control for managing multiple copies of an application file or application file software license is the physical location of the application file or the program disk. The details of controlling physical access and the degree of inconvenience vary, but in a world of hard disks, networks, file servers and electronic email, management based on controlled distribution is intrinsically impractical or even impossible. Without any practical tools, site administrators are forced to rely on redundant license management systems at each site.

The primary reason a company purchases hardware and software is to improve employee productivity and to enable employees to do things they could not do otherwise. Reduced productivity because users need to wait for software licenses to be available is a very real cost. These costs can delay product development or manufacture and reduce customer and employee satisfaction. It is a problem if the license server at one location fails, resulting in no software licenses available and thus, a reduction in productivity.

A solution to the problem is to break the software licenses into sets and provide each site with its own license server, licensing management software and a subset of software licenses. User equipment is configured to request a software license from one of the multiple license servers. Using this solution, users at each site contact their local license server first. If the license server does not have a license available, the user is required to request a license from another server across the WAN. Using this solution, when one server fails, then only the subset of software licenses allocated to the failed license server are unavailable. However, the user has no way of knowing which license server has a software license available. The problem is exasperated when additional sites are added, providing fewer software licenses at each site and additional sites to contact to request a software license. It is also a problem when the number of software licenses available at the other sites is not sufficient to meet the demand, again, reducing productivity.

A solution to the problem is implemented by FLEXlm, from GLOBEtrotter Software, Inc., in San Jose, Calif. This solution is based on providing three license servers each having a unique host identification and including the unique host identifiers of all three of the license servers in a license file. The three license servers are interconnected and track the number of software licenses that are available within the system. When one of the license servers is disconnected from the other license servers, the disconnected license server is not permitted to distribute software licenses. The connected license servers continue to receive software license requests, grant software licenses and track the number of software licenses that are available within the system and the number of software licenses that were granted by the disconnected license server. This solution prevents distribution of more software licenses than are purchased. It also provides a method for continuing to monitor the number of software licenses granted by the disconnected license server, thus allowing all of the software licenses to be granted. A problem occurs when a second of the three license servers fails or is disconnected, resulting in no software licenses being available.

For these reasons, a need exists for a software license management system to allow an alternative computer device having the required software license management software to manage software licenses when the license server fails.

SOLUTION

The present method for authorizing a substitute software license server overcomes the problems outlined above and advances the art by allowing the customer or the license server to gain approval from the software provider to temporarily authorize a substitute license server to process user requests.

The present method for authorizing a substitute software license server is intended for use by a business operating a license server running a license management software wherein the license server is assigned a host identification. The plurality of software licenses are also assigned the same host identification and only a license server having the matching host identification may authorize use of the plurality of copies of the application file. In response to an application file usage request, the license server checks the number of application file usage requests authorized and the number of software licenses available. If the number of application file usage requests authorized is less than the number of software licenses, the usage request is authorized.

When the license server fails, application file usage requests are not processed. The present method for authorizing a substitute software license server allows the customer to contact the software provider to request authorization to utilize a substitute license server for processing the application file usage requests. The substitute license server may be any computer system meeting the requirements of the license management software. The software provider downloads the necessary application software to the substitute license server and authorized substitution for a period of time. When the time period expires, the substitute license server discontinues processing the application file usage requests.

In an alternative embodiment, the registered substitute license server is connected to the customer network. The substitute license server contacts the software provider and requests authorization to process application file use requests. After checking the registration, the software provider downloads the necessary application software to the substitute license server and authorized substitution for a period of time.

When the time period expires, the substitute license server discontinues processing the application file usage requests.

DETAILED DESCRIPTION

The authorization of redundant software license management servers summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

A number of software providers license software files under a pricing model wherein a customer purchases the right to concurrently use a predetermined number of copies. Software files that are sold for concurrent usage are often delivered with license management software installed on a license server, from which users request software licenses. The licensing management software ensures that the customer does not use more licenses than they have purchased and are entitled to use.

Figure 1:
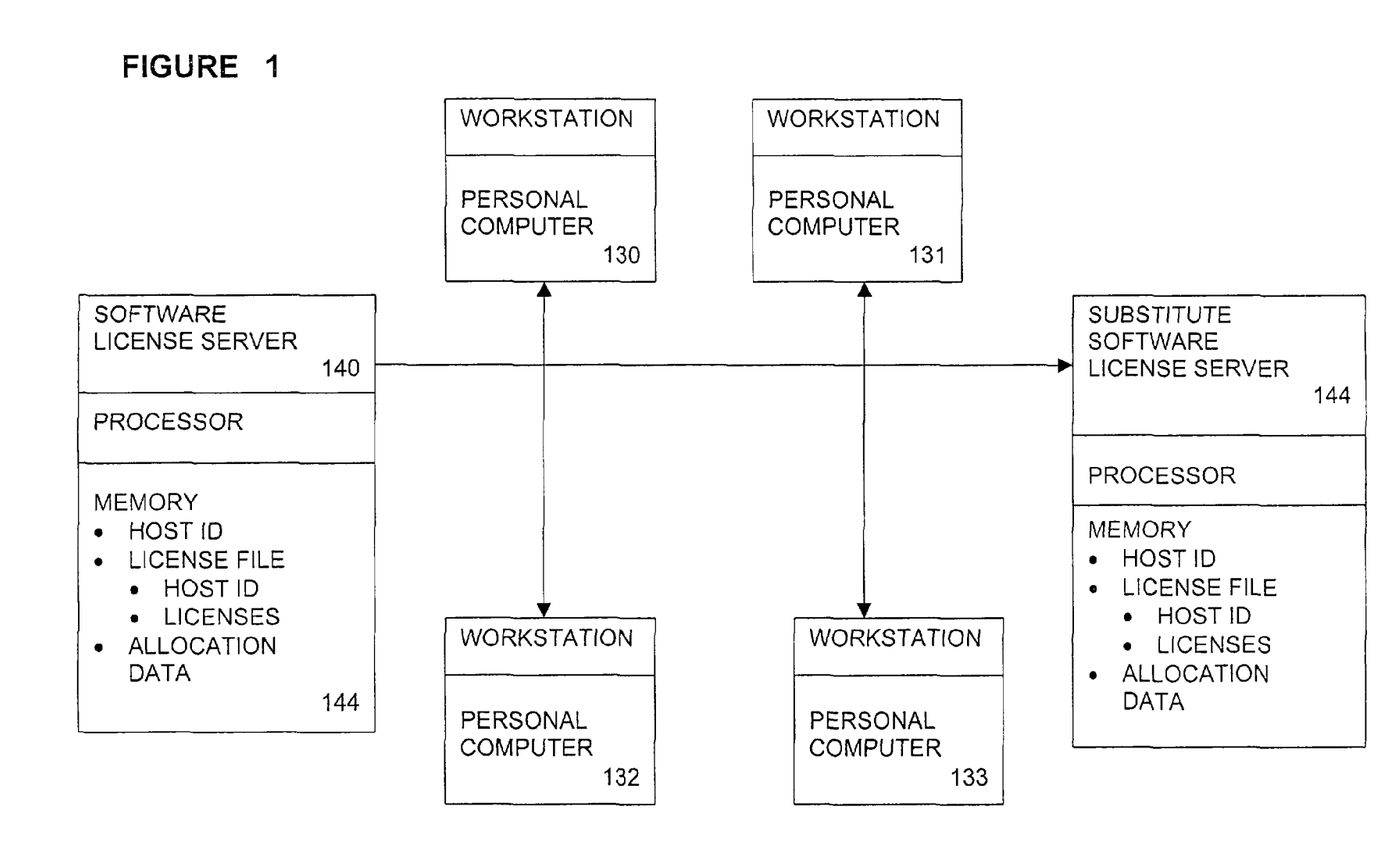
FIG. 1 is a block diagram of a network utilizing a primary software license server.

Network Configuration—FIG. 1:

A software license network 100 configuration includes a software license server 140 for controlling software license distribution and a plurality of workstations having computers 130-133 on which to execute the software file as illustrated in FIG. 1. The software license server 140 and the plurality of workstations 130-133 are linked together via a communication channel such as local area network (LAN) for requesting and allocating application file usage. The software license server 140 includes a processor for executing a software license management application required to process usage requests and to authorize concurrent usage of a corresponding application file when a software license is available. License server 140 also includes a memory for storing software license file and application file allocation data. The software license network is configured to provide a method for multiple workstations 130-133 to concurrently use a predetermined number application files corresponding to the predetermined number of software licenses. The software license network 100 may also include a network server 120 used by the plurality of workstations to store and retrieve data files.

While the network configuration just described includes a plurality of workstations, the term workstation used throughout the following description is for illustration only and it is understood that a server or other type of computer may be substituted. Similarly, the phrase "application file" refers generally to a feature or a single file which could contain an application file including one or more features that may be individually turned on or off with a license and is not limited to a single feature or a single application file.

In the example illustrated in FIG. 1, three licensed copies of the application file are available for concurrent usage by four users at the four workstations. The license server 140 receives application file usage requests from the users at the four workstations 130-133. If a software license is available, the user is authorized a concurrent application file usage allowing the user to access and use the corresponding application file. When the number of software licenses allocated for concurrent usage equals the predetermined number of software licenses available, subsequent application file usage requests are denied. Three copies of the application file may be running on any of the four computers 130-133 on the network, as long as the number of concurrently running copies of the application file does not exceed the number of floating licenses purchased, three software licenses in this example.

Each software license server 140 is assigned a unique host identifier allowing the software license provider to control the number of software licenses available at the particular software license server. The software file residing in the license server memory 140 includes the predetermined number of software licenses and the unique host identification of the license server on which it is installed. The license server 140 accessing the license file must be assigned the same unique host identification. A problem occurs when the host identification of the license server does not match the host identification within the license file, the license server is not authorize to access the license file for processing usage requests. Thus, when a license server fails, an alternative license server can not be substituted. Instead, usage requests for concurrent usage of the application file are denied. Likewise, as users terminate usage of an application file, usage of the application file is not available to other users.

Software License Server Operation

Figure 2:
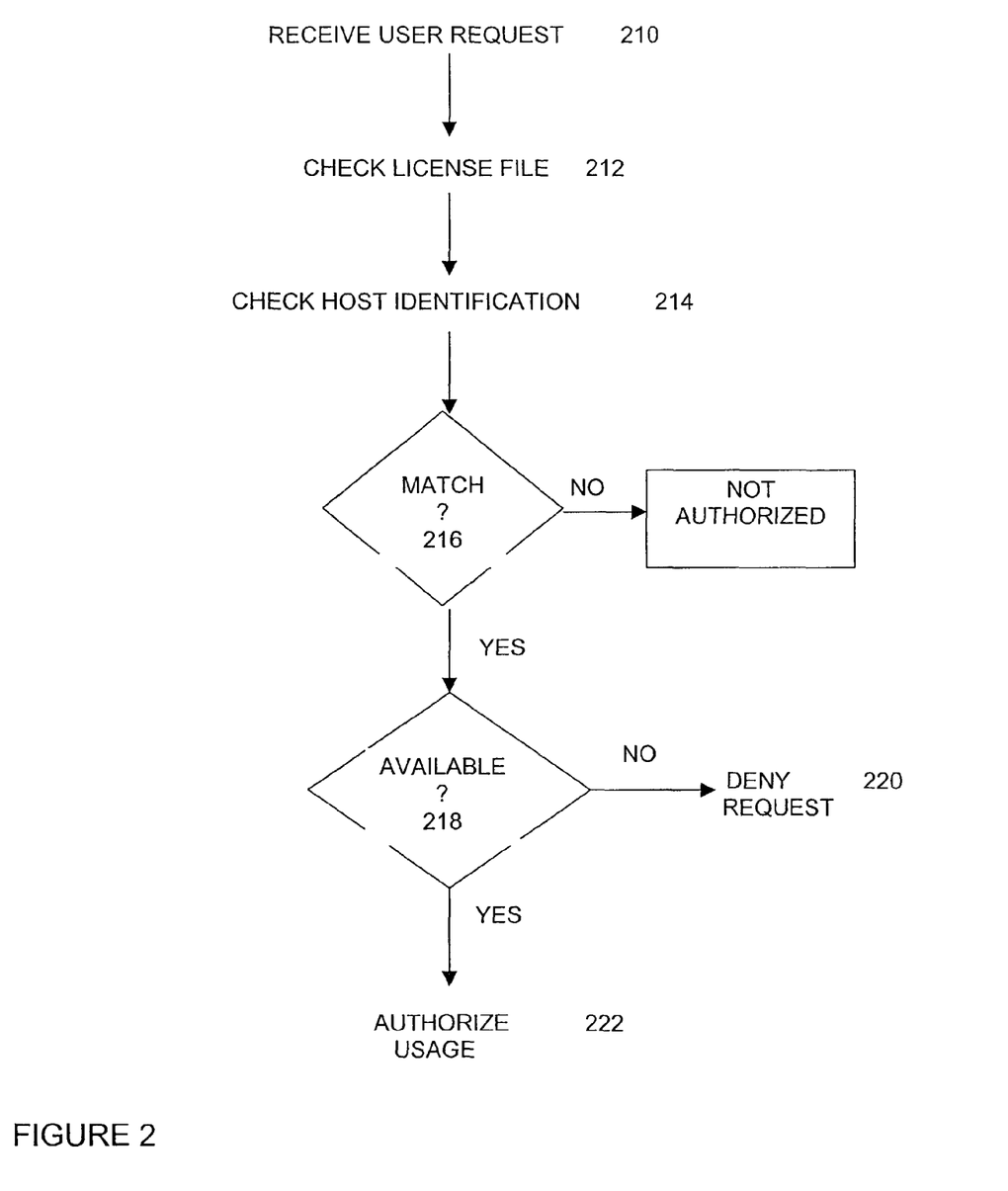
FIG. 2 is a flow diagram of a method of processing application file usage requests in accordance with the present method for authorizing a substitute software license server.

Referring to the operational flow diagram of FIG. 2, the license server receives application file usage requests in step 210 from the plurality of users connected to the network. In response to a user request, in step 212 the license server checks the license file to determine the number of software licenses available and the number of concurrent users authorized. In step 214 the processor executing the software license management application compares the host identification of the license server processing the usage request and the host identification within the license file. If the host identifications match in step 216, the license server is authorized to process the user request. In step 218, the license server determines the availability of a software license. If a software license is available in step 218, concurrent usage is authorized in step 222. When the number of concurrent application file users equals the number of software licenses available, the usage request is denied in step 220 until one of the concurrent users terminates usage of a copy of the application file.

When a license server fails, the operator may substitute a backup license server. However, if the host identifications do not match in step 216, the license server is not authorized to process the user request. Thus, the license server that is installed to ensure that the customer does not use more software licenses than they have purchased and are entitled to use, blocks usage of all of the software licenses. The present method for authorizing a substitute software license server overcomes the problem by allowing the customer or the license server to gain approval from the software provider to temporarily authorize a substitute license server to process user requests.

Figure 3:
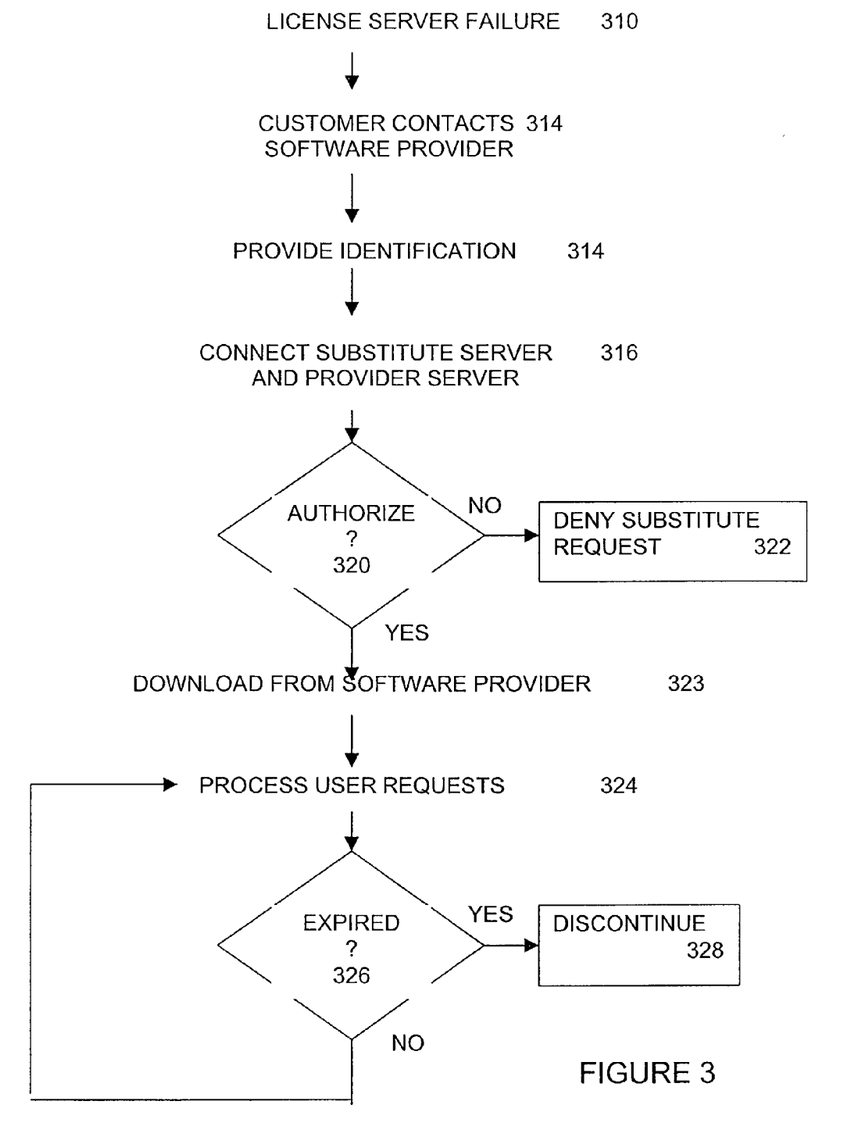
FIG. 3 is a flow diagram of a manual process for authorization of a substitute software license server in accordance with the present method for authorizing a substitute software license server.

Manual Substitute License Server Authorization—FIG. 3:

The present method for authorizing a substitute software license server allows a customer to contact the software provider in step 312 to request permission to temporarily authorize a substitute license server to process application usage requests when the host license server fails in step 310. The software provider may require the substitute license server to be registered prior to the request. The software provider may request information in step 314 including the host identification and the expected duration of time for which the substitution is sought. In step 316 the substitute license server communicates with the software provider server via a secure communication channel to request authorization in step 318 to process application file requests. If the substitute license server is not registered with the software provider, the substitute license server may not be authorized in step 324 and therefore does not have permission to process user application file requests and the substitution request is denied in step 322.

If the substitute license server is registered with the software provider, the substitute license server is authorized in step 320 to process application file usage requests in step 324. Prior to processing the plurality of application file usage requests, the software provider server downloads the license management software and a substitute license file in step 323 to the substitute license server. The substitute license file may include a temporary identification and a plurality of software licenses having the temporary identification. Since the identification of the substitute license server matches the software license identification, the substitute license server is allowed to authorize concurrent usage of the corresponding application files. The substitute license server continues to process application file usage requests until the time period for which the substitute license server is authorized expires in step 326, at which time the substitute license server discontinues processing application file usage requests in step 328.

Figure 4:
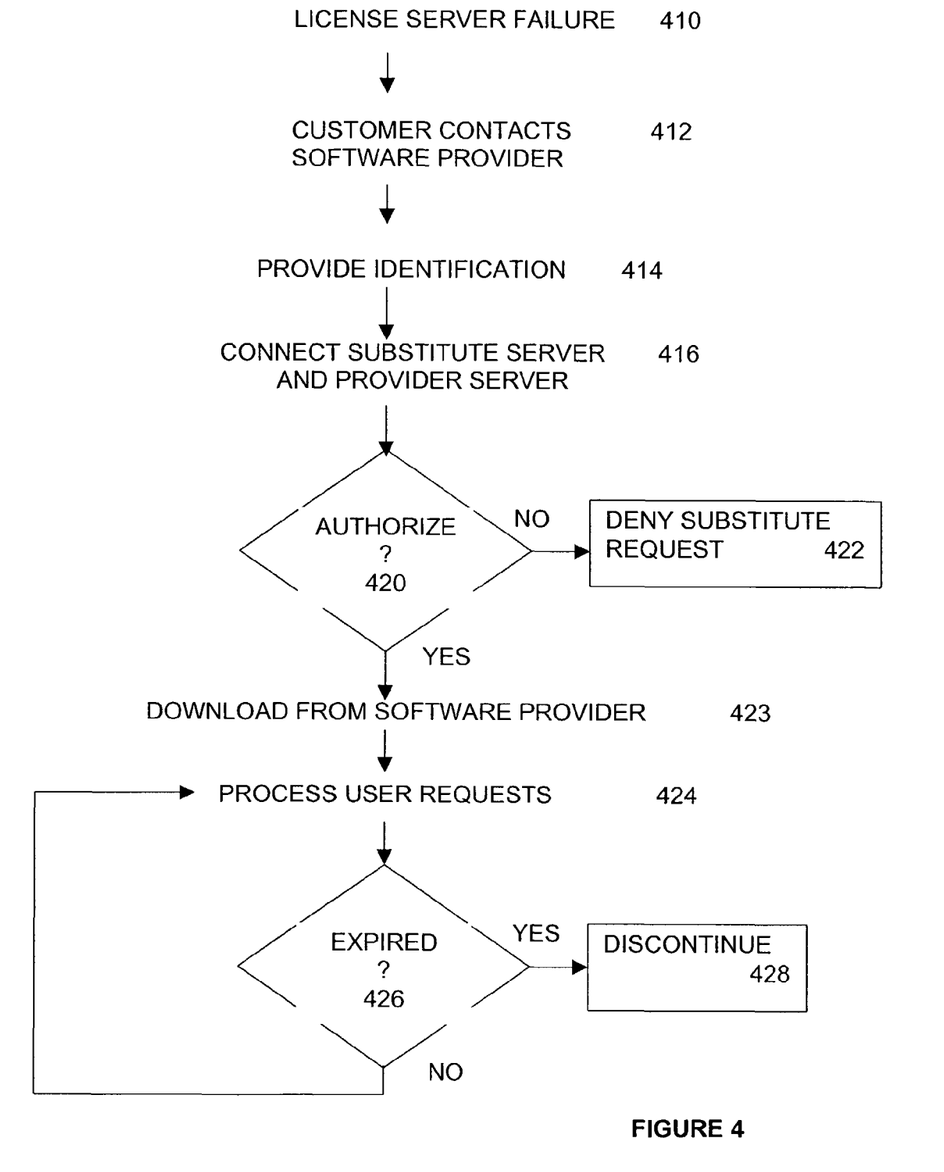
FIG. 4 is a flow diagram of an automatic process for authorization of a substitute software license server in accordance with the present method for authorizing a substitute software license server.

Automatic Substitute License Server Authorization—FIG. 4:

In an alternative embodiment, the software license management application includes a process for contacting the software provider to request permission to temporarily authorize the substitute license server to process application usage requests when the host license server fails. The substitute license server may be connected to the network and periodically query the host license server to ensure that the host license server is operational. If the query is not responded to, in this alternative embodiment, the registered substitute license server contacts the software provider in step 412. If the registered substitute license server is not connected to the network, the customer may, in response to failure of the host license server in step 410, connect the substitute license server and initiate communication in step 412 between the substitute license server and the software provider.

The software provider may request information in step 414 including the host identification and the expected duration for which the substitution is sought. In step 416 the substitute license server communicates with the software provider server via a secure communication channel to request permission in step 418 to process application file requests. If the substitute license server is not registered with the software provider, the substitute license server is not authorized in step 424 and therefore does not have permission to process user application file requests and the substitution request is denied in step 422.

If the substitute license server is registered with the software provider, the substitute license server is authorized in step 420 to process user application file requests in step 424. Prior to processing the plurality of application file usage requests, the software provider server downloads the license management software and a substitute license file in step 323 to the substitute license server. The substitute license server continues to process application file usage requests in step 424 until the time period for which the substitute license server is authorized expires in step 426, at which time the substitute license server discontinues processing application file usage requests in step 428.

The present method for authorizing a substitute software license server allows a customer to register a substitute license server to prevent having periods of downtime where application file usage requests, and therefore application file usage, is not available. Thus increasing user productivity by providing an alternative license server to process application file usage requests when the host license server fails. The software provider may allow the user to take advantage of the present method for authorizing a substitute software license server as a feature that is purchased by the customer. As a paid for feature, only those license servers having the feature activated may take advantage of requesting authorization of a substitute license server.

As to alternative embodiments, those skilled in the art will appreciate that the present method for authorizing a substitute software license server has been described authorizing a substitute license server. The substitute license server may be any computer system meeting the system requirements of the license management software to be utilized as a substitute.

Software license management systems having redundant license servers may also utilize from the present method for authorizing a substitute software license server. In a redundant software license server system, when one of the software license servers fails, application file usage requests directed to that particular license server are not processed, thus not authorizing additional users. A redundant software license system utilizing the present method for authorizing a substitute software license server may connect a substitute license server and request authorization to process application usage requests.

Substitution for a failed license server is particularly useful in fragmented software license systems having multiple license servers wherein each license server authorizes usage of a subset of the plurality of software licenses. When a license server fails, the subset of software licenses available for authorization by the failed license server is not available for authorizing application file usage requests, thus the customer is unable to authorize usage of the total number of software license that the customer paid for.

The present method for authorizing a substitute software license server is also useful for a small business that does not have multiple license servers authorizing application file use. In this environment, the customer may substitute any computer system meeting the requirements of the license management software for the failed software license server. Thus reducing cost to the customer and improving productivity by reducing downtime.

Alternative embodiments will occur to those skilled in the art. Although the present method for authorizing a substitute software license server has been described and illustrated for a network configuration having one software license server, two or more software license servers may be concurrently operating within the same network. Similarly, although embodiments were described and illustrated wherein the software license server authorized the usage of an application file corresponding to the software license, the software license server may authorize concurrent usage of one or more features or the application file may contain one or more features that are independently authorized by a software license. Such variations and alternatives are contemplated, and can be made without departing from the spirit and scope of the invention claimed in the appended claims.

It is apparent that there has been described a method for authorizing a substitute software license server that fully satisfies the objects, aims, and advantages set forth above. While the authorization of redundant software license server method has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A method, operable at a software provider's server, for temporarily replacing a customer's failed host license server, which is assigned a unique host identification and a plurality of application file software licenses for authorizing usage of said plurality of application files in response to receipt of application file usage requests, comprising the steps, performed at a software provider's server, of:
   receiving a substitution request from the customer of the failed host license server to authorize the customer to use a designated host processor that is presently unused as a license server as a substitute license server for the failed host license server;
   comparing the information provided in said substitution request with a record of host license servers authorized to be used by said customer;
   authorizing substitution of the failed host license server with the customer's designated host processor as a substitute license server for a length of time; and
   downloading the necessary application software and a temporary authorization, including the license management software and a substitute license file comprising a plurality of software licenses having the temporary identification, from a software provider server to the substitute license server.

2. The method of claim 1, wherein the request for substitution is received from the customer's designated host processor.

3. The method of claim 1 wherein the step of downloading a temporary authorization comprises:
   granting authorization to substitute the failed host license server with the customer's designated host processor as a substitute license server for the length of time;
   downloading a temporary host identification from the software provider server to the substitute license server; and
   downloading a temporary license file including a plurality of application files having the temporary host identification to allow the customer's substitute license server to authorize usage of the plurality of application files.

4. The method of claim 3 wherein the step of granting authorization comprises:
   granting the request for substitution of the failed host license server if the designated host processor is registered with the software provider.

5. The method of claim 3, further comprising:
   downloading a license management software from the software provider server to the substitute license server for processing the application file usage requests and authorizing usage of the plurality of application files.

6. A method, operable at a software provider's server, for a software provider temporarily replacing a customer's failed host license server, which is assigned a unique host identification and a plurality of application file software licenses for authorizing usage of a plurality of application files in response to receipt of application file usage requests, comprising the steps, performed at a software provider's server, of:
   receiving a substitution request from the customer to substitute the customer's designated host processor that is presently unused as a license server as a substitute license server for the customer's failed host license server;
   confirming a registration of the customer's designated host processor, as a substitute license server, with a software provider registration data base;
   authorizing, if the substitute license server registration is confirmed, the customer to substitute the customer's designated host processor as a substitute license server for the failed host license server to process the plurality of application file usage requests for a limited period of time, using a plurality of software licenses having a temporary identification; and
   denying, if the substitute license server registration is not confirmed, the request for substitution.

7. The method of claim 6 wherein the step of authorizing the substitute server comprises:
   downloading license management software from the software provider server to the substitute license server for processing the application file usage requests;
   downloading the host identification from the software provider server to the substitute license server; and
   downloading a temporary license file from the software provider server to the substitute license server, including a plurality of application files having the host identification to allow the customer's substitute license server to authorize usage of the plurality of application files.

8. The method of claim 6 wherein the substitution request is received from the customer via a communication channel.

9. The method of claim 6 wherein the substitution request is received from the customer's substitute license server via the network connection.

10. A system, comprising:
   a software provider's server, comprising a processor and being operable to:
      receive, a substitution request from a customer to substitute a customer's designated host processor, that is presently unused as a license server, as a substitute license server for a failed host license server, wherein the customer's failed host license server is assigned a unique host identification by the software provider's server to manage a plurality of application file software licenses for authorizing software, the software licenses being associated with the software to be executed by a plurality of computer workstations in communication with the customer's failed host license server;
      confirm a registration of the customer's designated host processor, as a substitute license server, with a software provider registration data base;
      if the substitute license controller registration is confirmed, authorize the customer to substitute the customer's designated host processor as a substitute license server for the failed host license server to process the plurality of application file usage requests for a limited period of time, wherein the application file usage requests are associated with the software authorized by the plurality of application file software licenses;

download the necessary application software and a temporary authorization, including the license management software and a substitute license file comprising a plurality of software licenses having the temporary identification, from the software provider's server to the substitute license server; and deny, if the substitute license server registration is not confirmed, the request for substitution.

11. The system of claim 10, wherein the request for substitution is received from the customer's designated host processor.

12. The system of claim 10, wherein the operation of downloading a temporary authorization comprises:

granting authorization to substitute the failed host license server with the customer's designated host processor as a substitute license server for the length of time;

downloading a temporary host identification from the software provider server to the substitute license server; and downloading a temporary license file including a plurality of application files having the temporary host identification to allow the customer's substitute license server to authorize usage of the plurality of application files.

13. The system of claim 12, wherein the operation of granting authorization comprises:

granting the request for substitution of the failed host license server if the designated host processor is registered with the software provider.

14. The system of claim 12, the software provider's server further operable to:

upload a license management software to the substitute license server for processing the application file usage requests and authorizing usage of the plurality of application files.

* * * * *